(No Model.)

A. H. SMITH.
TROLLING HOOK.

No. 570,344.    Patented Oct. 27, 1896.

WITNESSES:

INVENTOR
A. H. Smith.
BY
ATTORNEYS.

UNITED STATES PATENT OFFICE.

ALLEN H. SMITH, OF SNOQUALMIE, WASHINGTON.

TROLLING-HOOK.

SPECIFICATION forming part of Letters Patent No. 570,344, dated October 27, 1896.

Application filed April 21, 1896. Serial No. 588,459. (No model.)

*To all whom it may concern:*

Be it known that I, ALLEN H. SMITH, of Snoqualmie, in the county of King and State of Washington, have invented a new and useful Improvement in Trolling-Hooks, of which the following is a full, clear, and exact description.

My invention relates to an improvement in trolling-hooks; and the object of the invention is to provide a trolling-hook of simple, durable, and economic construction which in its folded or normal position may be carried in the pocket without danger of catching in any adjacent article, and, furthermore, to so construct the hook that the moment it is taken by the fish it will fasten itself strongly in position, it being possible to release the hook from the mouth of the fish without introducing the fingers into said mouth, the removal of the hook being accomplished by a single movement thereof, and a further object of the invention is to provide for the hooks being folded or restored to their normal position before they are withdrawn from the mouth of the fish.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
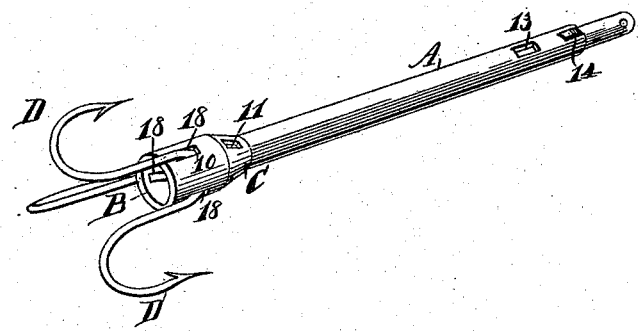
Figure 2:
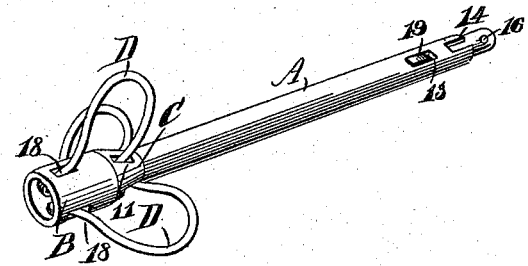
Figure 3:
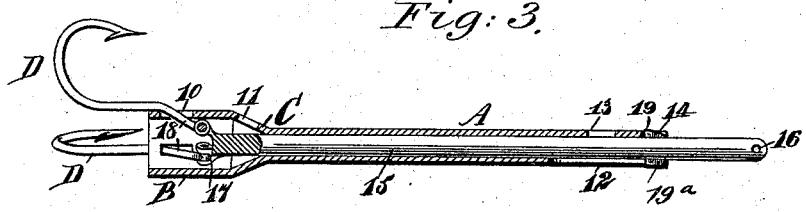

Figure 1 is a perspective view of the improved trolling-hook, illustrating it in its open position. Fig. 2 is a perspective view of the hook in its closed or normal position, and Fig. 3 is a longitudinal vertical section through the hook when in open position.

In carrying out the invention a casing A is provided, which casing at its outer end has a tubular enlargement B, which is provided with an inclined surface C, connecting the enlargement with the body of the casing. In fact, the enlargement B of the casing may be termed the "head" of the same and the inclined portion C the "neck."

In the head portion of the casing any desired number of longitudinal slots 10 are made, and corresponding slots 11 are produced in the inclined neck-surface C of the said casing, and at the inner end of the body of the casing a long longitudinal slot 12 is made in one side, and preferably opposite this long slot 12 two short slots 13 and 14 are produced, the latter slot being in the inner end of the body. A rod or plunger 15 is held to slide in the said casing, and its inner end is provided with an eye 16 or its equivalent, adapted to receive a swivel, which in its turn is to be attached to the fish-line.

At the forward or outer end of the plunger or rod 15 arms 17 are projected, and this portion of the rod is contained within the head of the casing. Upon each arm of the said rod the inner end of the shank of a hook D is pivoted, the inner portion of the shank of each hook being provided with an inclined section 18, and the shanks of the hooks are carried through the slots 10 in the head of the casing.

A lug 19 is formed upon the plunger or rod 15, adapted to enter either of the short slots 13 or 14 in the casing, and the long slot 12 is provided in order that the rod or plunger may be sprung sufficiently to cause the lug 19 to clear the short slot, in which it may be placed. The lug 19 is preferably given a segmental contour.

In operation, when the rod or plunger 15 is forced forwardly in the casing A the hooks, owing to the shape of their shanks and the slots in the head of the casing through which they pass, will be directed in such manner that the barbs of the hooks, when the plunger is in its innermost position, will enter the openings 11 in the neck of the casing, whereby the barbs of the hooks are guarded and the entire device may be carried in the pocket without danger. Although, preferably, the hooks are opened up in trolling, if the hooks should be cast closed the moment that a fish takes the hooks the hooks will be drawn forward or from their folded position to the position shown in Figs. 1 and 3, embedding themselves tightly in the mouth of the fish, it being understood that the trolling-hook above described is provided with the usual feathers, spoon, and other accessories. When the hooks are folded, the lug 19 of the plunger will enter the forward slot 13 of the casing, as shown in Fig. 2, and when the hooks are unfolded the said lug will enter the inner slot 14 of the casing, as shown in Fig. 1. In this manner the plunger and the hooks are held firmly in both the positions they are adapted to assume.

When removing the hook from the mouth of a fish, it is simply necessary to force the entire hook in an inwardly direction, whereupon the barbs will be released from the mouth, and then by forcing the plunger in the same direction and holding the casing stationary the hooks will be folded upon the said casing and the device may be readily withdrawn from the mouth of the fish without danger of catching in any portion of its anatomy.

The lug 19, being straight at its outer end, will bear firmly against the outer wall of the slot 14, holding the hooks rigid when pressed back to release them from the mouth of the fish. A lug 19$^a$ is also preferably placed upon the plunger 15 opposite the lug 19, the lug 19$^a$ sliding in the slot 12. Under this construction the plunger cannot turn.

Having thus described my invention, I claim as new and desire to secure by Letters Patent—

1. In a trolling-hook, the combination, with a casing having slots therein near one of its ends and openings adjacent to the said slots, of a plunger having sliding movement in the said pockets, hooks pivotally attached to the said plunger, the shanks of the hooks passing out through the openings in the casing, and a locking device whereby the plunger may be secured at intervals in its movement to the aforesaid casing, as and for the purpose specified.

2. The combination, with a casing having an enlarged head and an inclined neck connecting the head with the body, the head being provided with slots and the neck with corresponding openings, of a plunger having sliding movement in the casing, and hooks the shanks of which are passed through the slots in the head of the casing and pivotally attached to the plunger, the shanks having an angular formation, as and for the purpose specified.

3. The combination, with a casing, having an enlarged head and an inclined neck connecting the head with the body, the head being provided with slots and the neck with corresponding openings, of a plunger having sliding movement in the casing, hooks the shanks of which are passed through the slots in the head of the casing and pivotally attached to the plunger, the shanks having an angular formation, and a locking device, whereby the plunger may be rigidly secured to the casing, as and for the purpose specified.

4. The combination of a tube having two openings therein, a rod slidable within the tube and a hook having its shank pivotally connected to the rod and passed through one of the openings in the tube, the point of the hook being forced into the remaining opening of the tube upon movement of the rod, substantially as described.

5. The combination of a tube having an opening therein, a member slidable longitudinally through the tube, and a hook having its shank pivotally connected to the said member, the hook being at all times located out of the tube and having its point forced into the opening of the tube upon the movement of the member within the tube, substantially as described.

ALLEN H. SMITH.

Witnesses:
   WALTER R. LEGGE,
   CHARLES C. PYNE.